US012794865B2

(12) United States Patent
Nair et al.

(10) Patent No.: US 12,794,865 B2
(45) Date of Patent: Nov. 10, 2026

(54) PRIVACY INDICATORS FOR CONTROLLING AUTHENTICATION REQUESTS

(71) Applicant: Nokia Technologies Oy, Espoo (FI)

(72) Inventors: Suresh P. Nair, Whippany, NJ (US); Anja Jerichow, Grafing (DE); Annett Seefeldt, Berlin (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 106 days.

(21) Appl. No.: 18/242,963

(22) Filed: Sep. 6, 2023

(65) Prior Publication Data

US 2024/0007449 A1 Jan. 4, 2024

Related U.S. Application Data

(63) Continuation of application No. 15/794,856, filed on Oct. 26, 2017, now Pat. No. 11,792,172.
(Continued)

(51) Int. Cl.
*H04L 9/40* (2022.01)
*H04W 12/02* (2009.01)
(Continued)

(52) U.S. Cl.
CPC .......... *H04L 63/0442* (2013.01); *H04L 63/06* (2013.01); *H04L 63/083* (2013.01);
(Continued)

(58) Field of Classification Search
CPC ... H04L 63/06; H04L 63/083; H04L 63/0876; H04W 8/04; H04W 12/72; H04W 12/06
See application file for complete search history.

(56) References Cited

U.S. PATENT DOCUMENTS 8,261,078 B2 9/2012 Barriga et al.
8,347,090 B2 1/2013 Holtmanns et al.
(Continued)

FOREIGN PATENT DOCUMENTS

AU 2018261590 B2 2/2023
CN 101282519 A 10/2008
(Continued)

OTHER PUBLICATIONS

Notice of Acceptance for Australian Application No. 2023202706 dated Feb. 12, 2025, 3 pages.
(Continued)

*Primary Examiner* — Beemnet W Dada
(74) *Attorney, Agent, or Firm* — Alston & Bird LLP

(57) ABSTRACT

Techniques for providing privacy features in communication systems are provided. For example, a message may be provided from user equipment to an element or function in a communication network that comprises one or more privacy indicators, where privacy features for processing the message are determined based on the privacy indicators. The message may comprise an attach request comprising a subscription identifier for a subscriber associated with the user equipment, with the privacy indicators comprising a flag indicating whether the subscription identifier in the attach request is privacy-protected. As another example, the element of function in the communication network may determine privacy features supported by the communication network and generate and send a message to user equipment comprising one or more privacy indicators selected based on the determined privacy features. The privacy indicators may comprise an indication of whether the communication network is configured for handling privacy-protected subscription identifiers.

12 Claims, 7 Drawing Sheets

Related U.S. Application Data

(60) Provisional application No. 62/502,266, filed on May 5, 2017.

(51) Int. Cl.
*H04W 12/033* (2021.01)
*H04W 12/041* (2021.01)
*H04W 12/069* (2021.01)

(52) U.S. Cl.
CPC ......... *H04L 63/0876* (2013.01); *H04W 12/02* (2013.01); *H04W 12/033* (2021.01); *H04W 12/041* (2021.01); *H04W 12/069* (2021.01)

(56) References Cited

U.S. PATENT DOCUMENTS

| | | | |
|---|---|---|---|
| 9,344,881 B2 | 5/2016 | Forsberg et al. | |
| 9,801,055 B2 * | 10/2017 | Palanigounder | H04L 9/0891 |
| 10,389,691 B2 | 8/2019 | Zhu et al. | |
| 10,455,385 B2 | 10/2019 | Babbage et al. | |
| 10,609,561 B2 | 3/2020 | Nakarmi et al. | |
| 10,873,464 B2 | 12/2020 | Muhanna et al. | |
| 10,931,644 B2 | 2/2021 | Norrman et al. | |
| 11,096,045 B2 | 8/2021 | Ben Henda et al. | |
| 11,792,172 B2 | 10/2023 | Nair et al. | |
| 2003/0023451 A1 | 1/2003 | Willner et al. | |
| 2006/0196931 A1 | 9/2006 | Holtmanns et al. | |
| 2006/0227955 A1 | 10/2006 | Thai et al. | |
| 2007/0190977 A1 | 8/2007 | Fok et al. | |
| 2008/0130898 A1 | 6/2008 | Holtmanns et al. | |
| 2009/0119509 A1 | 5/2009 | Cho et al. | |
| 2010/0015951 A1 | 1/2010 | Hahn et al. | |
| 2010/0067676 A1 | 3/2010 | Thai et al. | |
| 2011/0191576 A1 | 8/2011 | Forsberg et al. | |
| 2013/0013923 A1 | 1/2013 | Thomas et al. | |
| 2013/0080779 A1 | 3/2013 | Holtmanns et al. | |
| 2013/0170643 A1 | 7/2013 | Xiao et al. | |
| 2014/0141746 A1 | 5/2014 | Tan et al. | |
| 2014/0359148 A1 | 12/2014 | Cherian et al. | |
| 2015/0148020 A1 | 5/2015 | Laden et al. | |
| 2016/0014630 A1 | 1/2016 | Xu et al. | |
| 2016/0098566 A1 | 4/2016 | Patil et al. | |
| 2017/0006469 A1 | 1/2017 | Palanigounder | |
| 2017/0070880 A1 | 3/2017 | Hahn et al. | |
| 2017/0094499 A1 | 3/2017 | Nenner et al. | |
| 2017/0164070 A1 | 6/2017 | Yang et al. | |
| 2017/0238122 A1 | 8/2017 | Yang et al. | |
| 2017/0332192 A1 | 11/2017 | Edge | |
| 2018/0014198 A1 | 1/2018 | Suh et al. | |
| 2018/0270666 A1 | 9/2018 | Lee et al. | |
| 2019/0036697 A1 | 1/2019 | Jerichow et al. | |
| 2019/0246275 A1 | 8/2019 | Nakarmi et al. | |
| 2020/0322794 A1 | 10/2020 | Baltatu et al. | |

FOREIGN PATENT DOCUMENTS

| | | | |
|---|---|---|---|
| CN | 102084608 A | 6/2011 |
| CN | 103841551 A | 6/2014 |
| CN | 105308992 A | 2/2016 |
| CN | 105900359 A | 8/2016 |
| CN | 106416329 A | 2/2017 |
| EP | 3281433 | 2/2018 |
| JP | 2000-031980 A | 1/2000 |
| JP | 6757845 B2 | 9/2020 |
| KR | 10-2009-0081033 A | 7/2009 |
| KR | 1020120120324 A | 11/2012 |
| KR | 102233860 B1 | 3/2021 |
| RU | 2185027 C1 | 7/2002 |
| RU | 2253948 C1 | 6/2005 |
| WO | WO 2016/117907 A1 | 7/2016 |
| WO | WO 2016/160256 A1 | 10/2016 |
| WO | WO 2016/162322 A1 | 10/2016 |
| WO | WO 2018/109256 A1 | 6/2018 |
| WO | WO 2018/204235 A1 | 11/2018 |

OTHER PUBLICATIONS

Office Action for Colombian Application No. NC2019/0013129 dated Mar. 27, 2025, 16 pages.
Office Action for Chinese Application No. 202211660042.9 dated Jun. 25, 2025, 8 pages.
Decision to Grant for European Application No. 18725091.5 dated Nov. 21, 2024, 2 pages.
Examination Report for Australian Application No. 2023202706 dated Jul. 5, 2024, 5 pages.
Extended European Search Report for European Application No. 24191132.0 dated Oct. 17, 2024, 15 pages.
Notice of Allowance for Korean Application No. 10-2023-7044920 dated Dec. 5, 2024, 5 pages.
Office Action for Colombian Application No. NC2019/0013129 dated Aug. 27, 2024, 20 pages.
Decision to Grant for Japanese Application No. 2022-073183 dated May 23, 2024, 4 pages.
Intention to Grant for European Application No. 18725091.5 dated Mar. 26, 2024, 39 pages.
Notice of Allowance for Mexican Application No. MX/a/2019/013181 dated Jun. 5, 2024, 6 pages.
Office Action for Canadian Application No. 3,062,521 dated Mar. 27, 2024, 4 pages.
Office Action for Korean Application No. 10-2023-7044920 dated Mar. 31, 2024, 6 pages.
Office Action for Vietnamese Application No. 1-2019-06835 dated May 28, 2024, 3 pages.
U.S. Appl. No. 15/794,856, filed Oct. 26, 2017, now U.S. Pat. No. 11,792,172, Patented.
"3rd Generation Partnership Project; Technical Specification Group Core Network and Terminals; Evolved Packet System (EPS); Mobility Management Entity (MME) and Serving GPRS Support Node (SGSN) related interfaces based on Diameter protocol (Release 15)", 3GPP 29.272 v15.1.0, (Sep. 2017), 166 pages.
"3rd Generation Partnership Project; Technical Specification Group Core Network and Terminals; Numbering, addressing and identification (Release 15)", 3GPP TS 23.003 v15.6.0, (Dec. 2018), 130 pages.
"3rd Generation Partnership Project; Technical Specification Group Services and System Aspects; Procedures for the 5G System; Stage 2 (Release 15)", 3GPP TS 23.502 v15.4.1, (Jan. 2019), 347 pages.
"3rd Generation Partnership Project; Technical Specification Group Services and System Aspects; Security architecture and procedures for 5G system (Release 15)", 3GPP TS 33.501 v15.4.0, (Mar. 2019), 187 pages.
3GPP, "3rd Generation Partnership Project; Technical Specification Group Core Network and Terminals; Evolved Packet System (EPS); Mobility Management Entity (MME) and Serving GPRS Support Node (SGSN) Related Interfaces Based on Diameter Protocol, (Release 14)," 3GPP TS 29.272 V14.0.0, Jun. 2016, 153 pages.
3GPP, "3rd Generation Partnership Project; Technical Specification Group Services and System Aspects; Procedures the 5G System; Stage 2 (Release 15)," 3GPP TS 23.502 V0.1.0, Jan. 2017, 44 pages.
3GPP, "3rd Generation Partnership Project; Technical Specification Group Services and System Aspects; Study on the Aspects of the Next Generation System (Release 14)," 3GPP TR 33.899 V1.1.0, Mar. 2017, 491 pages.
3GPP, "3rd Generation Partnership Project; Technical Specification Group Services and System Aspects; System for the 5G System; Stage 2 (Release 15)," 3GPP TS 23.501 V0.4.0, Apr. 2017, 124 pages.
Advisory Action for U.S. Appl. No. 15/794,856 dated Dec. 12, 2019.
Advisory Action for U.S. Appl. No. 15/794,856 dated Dec. 4, 2020.
China Mobile et al., "pCR Security Enhancement to the Attach Procedure Without Relying on PKI", 3GPP TSG SA WG3 (Security) Meeting #85, S3-161775, (Nov. 7-11, 2016), 5 pages.
China Mobile, "Update the Solution #7.10", 3GPP TSG SA WG3 (Security) Meeting #86bis, S3-170772, (Mar. 27-31, 2017), 2 pages.
Decision to Grant a Patent for Invention for Russian Application No. 2019139361/08 dated Oct. 6, 2020, 13 pages.

(56) References Cited

OTHER PUBLICATIONS

Decision to Grant for Japanese Application No. 2019-560230 dated Mar. 28, 2022, 4 pages.
Ericsson, "Alignment According to Withdrawal of I-WLAN Feature", 3GPP TSG-SA3 Meeting #85, S3-162018, Change Request 33.402 CR 0131 Rev 1, (Nov. 7-11, 2016), 55 pages.
Ericsson, "Alignment according to withdrawal of I-WLAN feature," 3rd Generation Partnership Project (3GPP), http://www.3gpp.org/ftp/Meetings_3GPP_SYNC/SA/Docs/, Nov. 11, 2016, 55 pages.
Ericsson, "Comment on S3-170878—Commenting Contribution to S3-170625—Conclusions of Security Area 7", 3GPP TSG SA WG3 (Security) Meeting #86-Bis, S3-170879, (Mar. 27-31, 2017), 1 page.
Ericsson, "Evaluation of Two New Privacy Solutions", 3GPP TSG SA WG3 (Security) Meeting #86-Bis, S3-170746, (Mar. 27-31, 2017), 2 pages.
Ericsson, "New KI—Privacy Aspects of RAN Level Subscription Identifiers", 3GPP TSG-SA WG3 Meeting #86, S3-170226, (Feb. 6-10, 2017), 2 pages.
Ericsson, "Update to Key Issue #2.3, and a New Solution on Identifiers Demonstrating the Proposed Terms", 3GPP TSG-SA WG3 Meeting #86, S3-170285, (Feb. 6-10, 2017), 8 pages.
Final Office Action for U.S. Appl. No. 15/794,856 dated Aug. 11, 2021.
Final Office Action for U.S. Appl. No. 15/794,856 dated Nov. 22, 2022.
Final Office Action for U.S. Appl. No. 15/794,856 dated Sep. 26, 2019.
First Examination Report for Indian Application No. 201947049204 dated Jul. 14, 2021, 7 pages.
Huawei et al., "Identity Privacy and Backwards Compatibility", 3GPP TSG SA WG3 (Security) Meeting #85, S3-161715, (Nov. 7-11, 2016), 6 pages.
Huawei et al., "Identity Privacy and Backwards Compatibility", 3GPP TSG SA WG3 (Security) Meeting #85, S3-162107, (Nov. 7-11, 2016), 6 pages.
Huawei et al., "MASA Handling Privacy and Meeting LI Requirements in All Scenarios", 3GPP TSG SA WG3 (Security) Meeting #86b, S3-170612, (Mar. 27-31, 2017), 3 pages.
Huawei et al., "MASA Solution Protecting Subscriber IMSI Privacy", 3GPP TSG SA WG3 (Security) Meeting #86b, S3-170619, (Mar. 27-31, 2017), 4 pages.
Huawei et al., "Update Requirement on Long Term Identifier Aspect of Key Issue 7.2", 3GPP TSG SA WG3 (Security) #85, S3-161681, (Nov. 7-12, 2016), 1 page.
Huawei et al., "Use of Legacy USIM and NextGen ME in Solution #7.12", 3GPP TSG SA WG3 (Security) Meeting #86, S3-170062, (Feb. 6-10, 2017), 6 pages.
Intel, "pCR to TR 33.899: Securing and Refreshing the Temporary Subscriber Identifiers", 3GPP TSG SA WG3 (Security) Meeting #86-Adhoc, S3-170632, (Mar. 26-31, 2017), 4 pages.
International Search Report and Written Opinion for Application No. PCT/US2018/030143 dated Jul. 19, 2018, 11 pages.
Nokia et al., "Additional Requirement on Transmission of Identities in Key Issue 7.6", 3GPP TSG-SA3 Meeting #85, S3-161842, (Nov. 7-11, 2016), 1 page.
Nokia, "Commenting Contribution to S3-170625—Conclusions of Security Area 7", 3GPP TSG SA WG3 (Security) Meeting #86-Bis, S3-170878, (Mar. 27-31, 2017), 1 page.
Nokia, "Open Questions Related to Concealment of Temporary Identifiers", 3GPP TSG SA WG3 (Security) Meeting #86bis, S3-170765, (Mar. 27-31, 2017), 1 page.
Nokia, "Open Questions Related to Key Issue #7.2—Concealment of Identifiers", 3GPP TSG SA WG3 (Security) Meeting #86, S3-170199, (Feb. 6-10, 2017), 1 page.
Nokia, "Open Questions Related to Key Issue #7.2—Concealment of Identifiers", 3GPP TSG SA WG3 (Security) Meeting #86bis, S3-170763, (Mar. 27-31, 2017), 1 page.
Nokia, "Open Questions Related to Key Issue #7.9—Full Protection of Permanent Identifier", 3GPP TSG SA WG3 (Security) Meeting #86bis, S3-170766, (Mar. 27-31, 2017), 1 page.
Nokia, "Privacy Solution", 3GPP TSG SA WG3 (Security) Meeting #85, S3-161830, (Nov. 7-11, 2016), 3 pages.
Nokia, "Privacy Solution", 3GPP TSG SA WG3 (Security) Meeting #85, S3-162061, (Nov. 7-11, 2016), 3 pages.
Nokia, "Solution Variant to #7.3", 3GPP TSG SA WG3 (Security) Meeting #86Bis, S3-170757, (Mar. 27-31, 2017), 1 page.
Non-Final Office Action for U.S. Appl. No. 15/794,856 dated Feb. 3, 2022.
Notice of Acceptance for ARIPO Application No. AP/P/2019/011959 dated Aug. 25, 2022, 5 pages.
Notice of Acceptance for Australian Application No. 2018261590 dated Jan. 18, 2023, 3 pages.
Notice of Acceptance for South African Application No. 2019/09865 dated Apr. 6, 2022, 1 page.
Notice of Allowance for Korean Application No. 10-2019-7036048 dated Jan. 20, 2022, 3 pages.
Notice of Allowance for Korean Application No. 10-2022-7013200 dated Dec. 29, 2022, 4 pages.
Notice of Allowance for Korean Application No. 10-2023-7010706 dated May 31, 2023, 3 pages.
Notice of Allowance for U.S. Appl. No. 15/794,856 dated Jun. 7, 2023.
Notice of Eligibility of Grant for Singapore Application No. 11201910230W dated May 8, 2023, 6 pages.
Office Action for ARIPO Application No. AP/P/2019/011959 dated Feb. 11, 2022, 4 pages.
Office Action for ARIPO Application No. AP/P/2019/011959 dated Jul. 6, 2021, 4 pages.
Office Action for Australian Application No. 2018261590 dated Feb. 28, 2022, 4 pages.
Office Action for Australian Application No. 2018261590 dated Jul. 5, 2022, 3 pages.
Office Action for Canadian Application No. 3,062,521 dated Aug. 4, 2022, 4 pages.
Office Action for Canadian Application No. 3,062,521 dated Jun. 9, 2023, 8 pages.
Office Action for Canadian Application No. 3,062,521 dated Oct. 21, 2021, 5 pages.
Office Action for Canadian Patent Application No. 3,062,521, dated Dec. 21, 2020, 4 pages.
Office Action for Chinese Application No. 201880040462.2 dated Aug. 3, 2022, 8 pages.
Office Action for Chinese Application No. 201880040462.2 dated Aug. 4, 2021, 11 pages.
Office Action for Chinese Application No. 201880040462.2 dated Mar. 16, 2022, 8 pages.
Office Action for Colombian Application No. NC2019/0013129 dated May 9, 2022, 11 pages.
Office Action for European Application No. 18725091.5 dated Aug. 19, 2020.
Office Action for European Application No. 18725091.5 dated Jun. 14, 2021, 5 pages.
Office Action for European Application No. 18725091.5 dated May 19, 2023, 4 pages.
Office Action for European Application No. 18725091.5 dated Sep. 29, 2022, 6 pages.
Office Action for Indonesian Application No. P00201910978 dated Apr. 12, 2023, 4 pages.
Office Action for Indonesian Application No. P00201910978 dated Feb. 3, 2022, 5 pages.
Office Action for Japanese Application No. 2019-560230 dated Sep. 15, 2021, 5 pages.
Office Action for Japanese Application No. 2022-073183 dated May 30, 2023, 4 pages.
Office Action for Japanese Patent Application No. 2019-560230 dated Jan. 3, 2020, with English translation, 22 pages.
Office Action for Kenya Application No. AP/P/2019/011959 dated Jul. 6, 2021, 4 pages.
Office Action for Korean Application No. 10-2019-7036048 dated May 3, 2021, 12 pages.
Office Action for Korean Application No. 10-2019-7036048 dated Nov. 18, 2021, 4 pages.

(56) References Cited

OTHER PUBLICATIONS

Office Action for Korean Application No. 10-2022-7013200 dated Jun. 29, 2022, 6 pages.
Office Action for Mexico Application No. MX/a/2019/013181 dated Apr. 19, 2023, 10 pages.
Office Action for Russian Application No. 2019139361/28(077409) dated Jun. 18, 2020, 11 pages.
Office Action for Singapore Application No. 11201910230W dated Jan. 10, 2022, 8 pages.
Office Action for Singapore Application No. 11201910230W dated May 8, 2023, 6 pages.
Office Action for U.S. Appl. No. 15/794,856 dated Apr. 4, 2019.
Office Action for U.S. Appl. No. 15/794,856 dated Jan. 21, 2021, 16 pages.
Office Action for U.S. Appl. No. 15/794,856 dated Mar. 2, 2020.
Office Action for U.S. Appl. No. 15/794,856 dated Sep. 3, 2020.
Office Action for Vietnamese Application No. 1-2019-06835 dated Jun. 21, 2023, 3 pages.
Office Action from European Patent Application No. 18725091.5, dated Nov. 17, 2020, 4 pages.
Qualcomm et al., "pCR to Update Solution #7.4: Privacy Enhanced Mobile Subscriber Identifier (PMSI)", 3GPP TSG SA WG3 (Security) Meeting #86bis, S3-170832, (Mar. 27-31, 2017), 5 pages.
Qualcomm Incorporated, "Enahncements to Solution 6.9 on Encrypting IMSI to Provide Privacy from the Serving Network", 3GPP TSG SA WG3 (Security) Meeting #85, S3-161814, (Nov. 7-11, 2016), 8 pages.
Qualcomm Incorporated, pCR to Provide an Evaluation on the Solution #7.4 Privacy Enhanced Mobile Subscription Identifier (PMSI), 3GPP TSG SA WG3 (Security) Meeting #86bis, S3-170837, (Mar. 27-31, 2017), 2 pages.
Qualcomm Incorporated, "pCR to Update Solution #7.4: Privacy Enahnced Mobile Subscriber Identifier (PMSI) to Clarify the PMSI Synchronization", 3GPP TSG SA WG3 (Security) Meeting #86bis, S3-170836, (Mar. 27-31, 2017), 4 pages.
Qualcomm Incorporated, "pCR to Update Solution #7.14: Privacy Enhanced Mobile Subscriber Identifier (PMSI)", 3GPP TSG SA WG3 (Security) Meeting #86, S3-170293, (Feb. 6-10, 2017), 5 pages.
Qualcomm Incorporated, "Privacy & Security of Registration and Slice Selection Information", 3GPP TSG SA WG3 (Security) Meeting #86Bis, S3-170845, (Mar. 27-31, 2017), 2 pages.
Telecom Italia et al., "Updating Solution #7.14 Privacy Protection of Permanent or Long-Term Subscription Identifier Using ABE", 3GPP TSG-SA WG3 Meeting #86, S3-170343, (Feb. 6-10, 2017), 9 pages.
Telecom Italia, "Comments to pCR to TR 33.899—Evaluations and Conclusions in Clause 7", 3GPP TSG SA WG3 (Security) Meeting #86-Bis, S3-170877, (Mar. 27-31, 2017), 13 pages.
Telecom Italia, "Updating Solution #7.14 Privacy Protection of Permanent or Long-Term Subscription Identifier Using ABE", 3GPP TSG SA WG3 (Security) Meeting #86bis, S3-170784, (Mar. 27-31, 2017), 9 pages.
Telecom Italia, "Updating solution #7.14 Privacy Protection of Permanent or Long-Term Subscription Identifier Using ABE:", 3GPP TSG-SA WG3 Meeting #86, S3-170187, (Feb. 6-10, 2017), 8 pages.
Thales, "pCR for Adding Solution for Key Issue #7.2: Concealing Permanent or Long-Term Subscriber Identifier with Opportunistic Encryption", 3GPP TSG SA WG3 (Security) Meeting #85, S3-161620, (Nov. 7-11, 2016), 3 pages.
Vodafone et al., "pCR to TR 33.899—Updating Key Issue 7.3", 3GPP TSG SA WG3 (Security) Meeting #86, S3-170080, (Feb. 6-10, 2017), 4 pages.
Written Opinion for Singapore Patent Application No. 11201910230W dated Mar. 17, 2021, 7 pages.
Office Action for European Application No. 18725091.5 dated Dec. 21, 2023, 6 pages.
Notice of Allowance for Indonesian Application No. P00201910978 dated Jan. 19, 2024, 4 pages.
Notice of Reasons for Refusal for Japanese Application No. 2022-073183 dated Nov. 6, 2023, 3 pages.
Notice of Allowance for Korean Application No. 10-2023-7029725 dated Sep. 27, 2023, 4 pages.
Office Action for Malaysian Application No. PI2019006451 dated Dec. 26, 2023, 3 pages.
Office Action for Mexican Application No. MX/a/2019/013181 dated Dec. 14, 2023, 8 pages.
Office Action for Vietnamese Application No. 1-2019-06835 dated Jan. 3, 2024, 3 pages.
Office Action for Japanese Application No. 2024-101356 dated Jun. 17, 2025, 4 pages.
Office Action for ARIPO Application No. AP/P/2023/015334 dated Aug. 5, 2025, 4 pages.
Communication about intention to grant a European patent Mailed on Dec. 11, 2025 for EP Application No. 24191132, 6 page(s).
Decision to Grant for ARIPO Application No. AP/P/2023/015334 dated Dec. 8, 2025, 33 pages.
Decision to Grant for Japanese Application No. 2024-101356 dated Dec. 11, 2025, 5 pages.
Office Action for Singapore Application No. 10202301861R dated Dec. 2, 2025, 12 pages.
Communication about intention to grant a European patent Mailed on Sep. 29, 2025 for EP Application No. 24191132, 6 page(s).
Notice of Allowance for Canadian Application No. 3,062,521 dated Aug. 27, 2025, 1 page.
Notice of Reasons for Refusal for Japanese Application No. 2024-101356 dated Sep. 29, 2025, 4 pages.
Substantive Examination Report for Philippine Application No. 1/2019/502488 dated Jan. 12, 2026, 5 pages.
Office Action for Vietnamese Application No. 1-2019-06835 dated Jul. 25, 2025, 4 pages.
Apple, "Privacy Protection for EAP-AKA", BGPP TSG SA W63 (Security) Meeting #86, 83-170116, (Feb. 6-10, 2017), 6 pages.
Decision to grant a European patent Mailed on Apr. 23, 2026 for EP Application No. 24191132, 2 page(s).
Nokia, "Key issue on transmitting temporary identifiers", BGPP TSG SA W63 (Security) Meeting #86, S3-170457, (Feb. 6-10, 2017), 2 pages.
Notice of Reasons for Refusal for Japanese Application No. 2025-187279 dated Mar. 23, 2026, 4 pages.
Decision to Grant for Japanese Application No. 2025-187279 dated Jul. 16, 2026, 4 pages.
Extended European Search Report for European Application No. 26172476.9 dated Jun. 24, 2026, 13 pages.
Jimenez et al, "Subscription Identifier Privacy in 5G Systems", 2017 International Conference on Selected Topics in Mobile and Wireless Networking (MoWNet), (May 1, 2017), 8 pages.
Notice of Allowance for Korean Application No. 10-2025-7007409 dated Jul. 3, 2026, 5 pages.
Office Action for Canadian Application No. 3,062,521 dated Jul. 31, 2026, 3 pages.

* cited by examiner

PRIVACY INDICATORS FOR CONTROLLING AUTHENTICATION REQUESTS

CROSS-REFERENCE TO RELATED APPLICATIONS

The present application is a continuation of U.S. Non-Provisional patent application Ser. No. 15/794,586, filed Oct. 26, 2017 and entitled "Privacy Indicators for Controlling Authentication Requests," which claims the benefit of priority to U.S. Provisional application Ser. No. 62/502,266, filed May 5, 2017 and entitled "Privacy Indicator for Controlling Authentication Requests," the entire disclosures of each of which are hereby incorporated herein in their entireties for all purposes.

FIELD

The field relates generally to communication systems, and more particularly, but not exclusively, to security within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high-capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission critical IoT services (e.g., requiring high reliability), improvements over legacy mobile communication services are supported in the form of enhanced mobile broadband (eMBB) services intended to provide improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network or an eNB (evolved Node B) in an LTE network. The access point (e.g., gNB/eNB) is illustratively part of an access network of the communication system. For example, in a 5G network, the access network is referred to as a 5G System and is described in 5G Technical Specification (TS) 23.501, V 0.4.0, entitled "Technical Specification Group Services and System Aspects; System Architecture for the 5G System," the disclosure of which is incorporated by reference herein in its entirety. In an LTE network, the access network is an Evolved Universal Terrestrial Radio Access Network (E-UTRAN). In general, the access point (e.g., gNB/eNB) provides access for the UE to a core network (CN), which then provides access for the UE to other UEs and/or a data network such as a packet data network (e.g., Internet).

Privacy is an important consideration in any communication system. Privacy is broadly addressed in 5G Technical Report (TR) 33.899, V 1.1.0, entitled "3rd Generation Partnership Project; Technical Specification Group Services and System Aspects; Study on the security aspects of the next generation system (Release 14)," the disclosure of which is incorporated by reference herein in its entirety. In particular, TR 33.899 identifies subscription (UE) privacy as one of the most important security areas to be addressed in 5G networks.

SUMMARY

Illustrative embodiments provide one or more privacy indicators for controlling authentication requests in communication systems.

For example, in one embodiment, a method comprises receiving, at an element or function in a communication network from user equipment of the communication network, a message comprising one or more privacy indicators and determining one or more privacy features for processing the message based on the one or more privacy indicators.

The message may comprise an attach request comprising a subscription identifier for a subscriber of the communication network associated with the user equipment, the one or more privacy indicators comprising a flag indicating whether the subscription identifier in the attach request is privacy-protected. The privacy-protected subscription identifier may comprise at least a portion of a permanent subscription identifier of the subscriber.

In another embodiment, a method comprises determining, at an element or function in a communication network, one or more privacy features supported by the communication network, generating, at the element or function in the communication network, a message comprising one or more privacy indicators selected based on the determined one or more privacy features, and sending, from the element or function in the communication network to user equipment of the communication network, the generated message comprising the one or more privacy indicators.

The one or more privacy features may comprise an ability of the element or function in the communication network to handle privacy-protected subscription identifiers.

In another embodiment, a method comprises determining, at user equipment of a communication network, one or more privacy features for processing a message, adding one or more privacy indicators to the message based on the determined one or more privacy features, and sending the message with the one or more privacy indicators from the user equipment to an element or function in the communication network.

The message may comprise an attach request comprising a subscription identifier for a subscriber of the communication network associated with the user equipment, the one or more privacy indicators comprising a flag indicating whether the subscription identifier in the attach request is privacy-protected.

In another embodiment, a method comprises receiving, at user equipment of a communication network from an element or function in the communication network, a message comprising one or more privacy indicators and determining one or more privacy features supported by the communication network utilizing the one or more privacy indicators.

The one or more privacy indicators may comprise an indication of whether the communication network is configured for handling privacy-protected subscription identifiers. The method may further comprise refraining from sending an attach request to the element or function in the communication network responsive to the one or more privacy indicators indicating that the communication network is not configured for handling privacy-protected subscription identifiers.

While these and other techniques described herein can be applied to various communication networks, they are particularly suitable for 5G and next generation communication networks.

These and other features and advantages of embodiments described herein will become more apparent from the accompanying drawings and the following detailed description.

DETAILED DESCRIPTION

Figure 1:
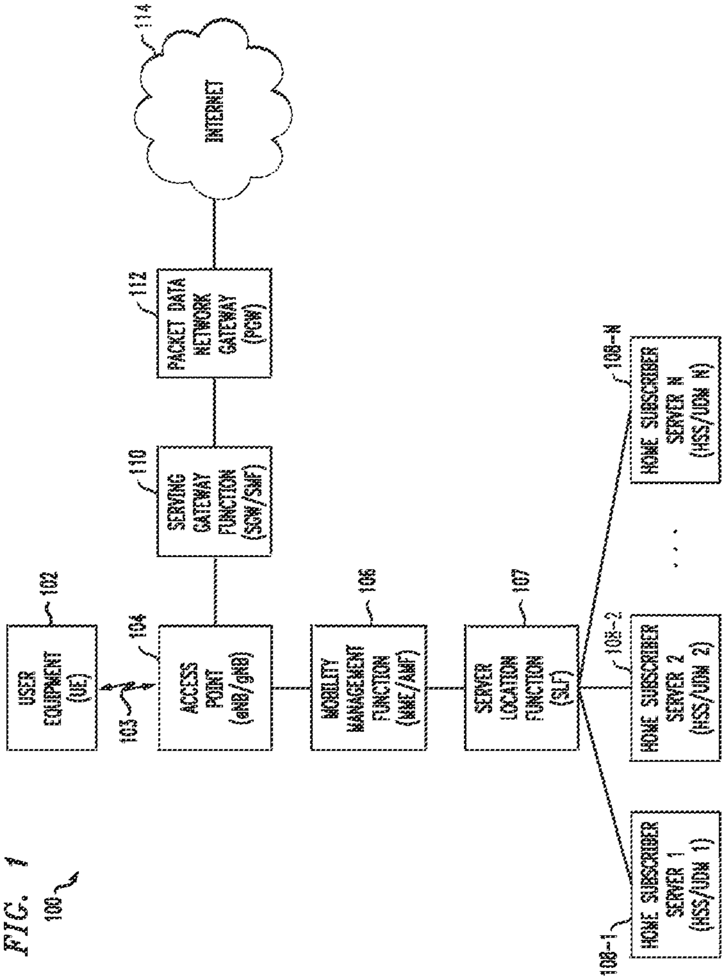
FIG. 1 shows a communication system in an illustrative embodiment.

Embodiments will be illustrated herein in conjunction with example communication systems and associated techniques for managing authentication requests in a manner which protects the privacy of the user's subscription identity. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as an LTE Evolved Packet Core (EPC) and a 3GPP next generation system (5G), the disclosed embodiments can be adapted in a straightforward manner to a variety of other types of communication systems including, but not limited to, WiMAX systems and Wi-Fi systems.

As mentioned above, privacy of subscription identifiers when communicating over the air interface between the user equipment and the network access point has been a significant issue for 2G/3G/4G networks. Efforts have been made in 5G networks to address this significant issue. Even if it is unavoidable that down bidding attacks (e.g., an attacker impersonates the user equipment to negotiate an inferior security capability with the network access point) may force a 5G UE to attach to a lower generation network, it is realized that there is a need to address these privacy demands.

The above-referenced TR 33.899 describes several solutions to provide privacy over the air interface that can be generally grouped in three solution classes:

1) pseudonym solutions based on symmetric cryptographic systems, which demand a home subscriber server/function of the UE's home network to map a changing pseudonym to the permanent subscription identifier of the UE;
2) encryption of the permanent subscription identifier of the UE using the public key of the home network operator; and
3) encryption of the permanent subscription identifier of the UE using the public key of the serving network operator.

Note that, in one example, an International Mobile Subscriber Identity (IMSI) is a permanent subscription identifier (subscriber identity) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN).

Note also that in an LTE network, the home subscriber server/fimction is called a Home Subscriber Server (HSS), and in a 5G network it is called User Data Management (UDM) which may also comprise an Authentication and Security Function (AUSF) and an Authentication Credential Repository and Processing Function (ARPF) as part of the UDM function.

While some illustrative embodiments are described herein from the perspective of the second solution class (i.e., the home network public key based solution), alternative embodiments may be implemented for the other two solution classes. See SA2 TS 23.502 and SA3 TR 33.899, the disclosures of which are incorporated by reference herein in their entireties.

In the home network public key based solution, the home operator provides its public key to all home network subscribers. They will use it to encrypt the subscriber identity, which is, by way of example, the MSIN part of IMSI. Only the MSIN part needs to be encrypted, because MNC+MCC is needed by the serving network to route to the correct home network. Only the home HSS can decrypt the message because it possesses the private key that corresponds to the public key. Once the IMSI is identified, HSS/AuC (where AuC is the Authentication Center part of the HSS) will create authentication vectors (AVs) based on the distinct shared root key K between a user (subscriber) and the HSS/AuC. Similarly, in the 5G network, the UDM/ARPF creates the AV's requested via AUSF. AUSF and UDM could be co-located for optimization reasons.

An operator in his network may have implementations of multiple HSSs which allows him to manage distinct sets of users in different HSSs/UDMs. Because of the multiple HSSs, a Server Location Function (SLF) may be implemented in front of a set of HSSs. Note that SLF may also be referred to as a Subscriber Location Function. The SLF analyzes the authentication request for a user received from the MME/AMF and routes it to the correct HSS.

By way of example only, operation of the SLF is described in 3GPP TS 29.272 (Section 8: "User identity to HSS resolution") entitled "3rd Generation Partnership Project; Technical Specification Group Core Network and Terminals, Evolved Packet System (EPS); Mobility Management Entity (MME) and Serving GPRS Support Node (SGSN) related interfaces based on Diameter protocol (Release 14)," the disclosure of which is incorporated by reference herein in its entirety. The SLF provides user identity (IMSI)-to-HSS resolution using a locally maintained subscriber profile database and routes the Diameter messages containing the user authentication requests, as a Diameter proxy to the chosen HSS. Note that, in 5G, similar functionality would also be requested if 5G core network protocols are different from Diameter, e.g., using http-proxies. In the following descriptions, it is assumed that the SLF is covering both the DRA (Diameter Routing Agent) based solution as per 4G or any other proxy related solution dependent on protocol decisions for the 5G core network.

It is realized herein that if the home operator uses an SLF to split its set of subscribers, the SLF would need to evaluate the received identifier first Thus, in a 5G network with permanent subscriber identity (e.g., IMSI) encrypted by one of the methods, an SLF would need to take over the decryption of the MSIN part of the IMSI. Further, the SLF would need to keep a database of all subscribers' profiles with the routing information, i.e., a profile should map a subscriber's permanent identity (e.g., IMSI) to one of the HSSs in the network to forward the Authentication Request after decrypting the received (encrypted) IMSI. Therefore, it is advantageous to perform the decryption of the encrypted IMSI at the SLF instead of in the HSS. Hence, instead of an HSS storing the private key, now the SLF would need to store and use the network private key. An SLF is placed in the home operator's domain and considered trusted. In general, an SLF could be assumed in a large operator network. The usage of an SLF simplifies the new privacy management for the HSS/UDM in 5G networks up to the point that HSS/UDM is not changed at all for the protection of subscription identifiers over the air interface, but the SLF needs to perform the additional functionality of encrypted IMSI decryption and then perform the IMSI-to-HSS resolution.

Accordingly, illustrative embodiments as described herein address the issue of how the HSS/UDM or the SLF can efficiently deal with newly introduced privacy features, i.e., that the received attach request first needs to be decrypted. If this is not taken care of, the HSS/UDM or SLF would receive a request and attempt to process it wasting unnecessary computing resources.

Privacy will depend on country specific regulation, therefore HSS/UDM or SLF would need to be implemented to handle both cases of a request for authentication vectors, i.e., to process or forward a "normal" attach request if the 5G UE has not applied privacy or to process a "privacy" attach request.

In a first illustrative embodiment, the 5G UE, if it wants to protect its privacy, adds an identity privacy flag (i.e., privacy indicator) to indicate that the MSIN is provided in encrypted form.

It is to be appreciated that the privacy indicator, in addition to being an "explicit" privacy indicator such as a flag or field, can alternatively be an "implicit" privacy indicator. By implicit privacy indicator, it is meant that the privacy feature is conveyed by the UE to a network element/function via the algorithm used to encrypt the message. Thus, the network element/function receiving the message from the UE is informed of the privacy feature by the fact that the message is encrypted with a particular encryption algorithm. This also applies to a null-encryption scheme. In a null-encryption scheme, the input equals the output, and the SUPI (Subscription Permanent Identifier of the UE) is unencrypted, i.e., a format-preserved scheme. One could interpret this as the SUPI (or IMSI) is always encrypted, but if no privacy is "switched on," then the null-encryption is used. Thus, the privacy indicator would implicitly reside in the algorithm scheme used (e.g., null-encryption or an algorithm that actually encrypts a message).

It could be suggested that the HSS or SLF, even without this privacy indicator, will figure out after the first attempt to solve the request and, if encrypted, to attempt the decryption. But one key reason to have such an indication specified is that this saves processing time and fewer resources are needed. Thus, in this first illustrative embodiment, the SLF can make the decision on the processing by looking at this flag. If not set, the SLF will assume the provided IMSI is unencrypted, will do the IMSI-to-HSS resolution, and will forward to the correct HSS/UDM, i.e., compatibility with 4G operation is maintained. If the flag is set, the SLF will recognize that the provided IMSI is encrypted and use the network private key to decrypt the MSIN part to form the real unencrypted IMSI, perform the IMSI-to-HSS resolution and then forward the Authentication Request to the correct HSS/UDM. If no SLF is used, the same principle can be used by the HSS/UDM. That is, HSS/UDM has to check whether the 5G UE has set a flag and then decide whether decryption is needed.

This first illustrative embodiment can be applied to a 5G UE attaching via a 5G RAN (Radio Access Network) to a 5G core network (CN). However, 3GPP has identified, as the immediate deployment scenario, that the 5G UE should attach via a 5G RAN to a 4G CN. If the UE sets the indicator, the 4G CN would need to be enhanced to understand the identity privacy flag or other privacy indicator.

From a network architecture perspective for the operator with an evolving 4G network to 5G, both 4G and 5G access and core networks need to be supported for a considerable time. This means that current 4G HSS needs to be supported while supporting new 5G HSS functions of decrypting an encrypted MSIN. In accordance with embodiments, placing an SLF capable of identifying an encrypted MSIN and decrypting it before routing the authentication request to an HSS helps to manage the coexistence of 4G and 5G core in an operator network. Enhancing the SLF to support the new identity 5G privacy feature is more advantageous than enhancing the HSS. If the HSS is enhanced, then in a large network with multiple HSSs, all the HSSs need to be updated together with capability to decrypt an encrypted IMSI. This may be more tedious to handle compared to solving the problem in a single central node (e.g., the SLF). Advantageously, with the first illustrative embodiment, a bidding down attack in 5G (to 4G) would not be beneficial if the same feature is also deployed in 4G whereby an enhanced SLF is used to achieve this feature.

In a second illustrative embodiment, another privacy indicator is provided that the operator could decide to add, e.g., to the network Master Information Block (MIB)/System Information Block (SIB) broadcast, to indicate to the 5G UE that the network will be able to handle a privacy-protected identifier, e.g., a flag that indicates that privacy is expected, possible to process, or desired. It is then up to the 5G UE implemented/configured policy, whether to attach at all to a network, if this indicator is not sent. The indicator on the 4G/5G network side would be to indicate regulation needs per country/region, i.e., switch on/off privacy. Note, while the UE is roaming in a visiting network, even though the UE authentication request from the visiting network is forwarded to the home network, for which the identity privacy indicator (first illustrative embodiment above) is described, there is a need to make adaptations to the serving network as well. The MME/SEAF (SEAF is a Security Anchor Function) has to handle the enhanced initial attach message from the UE, form the UE Authentication Request message, and route it to the home network for requesting the AV. If the subscription identifier is encrypted, the size of the message field for the encrypted IMSI may be different from today's 4G IMSI field (depending on the solution class chosen).

Note that the visiting network can also indicate its availability and, if applicable, its non-usage of privacy. This information can be broadcast, for example, as part of the SIB or other information block, or sent as an explicit request message to each UE.

In a third illustrative embodiment, the UE is configured to manage a privacy indicator that can be set to prohibit a 5G UE from responding to IMSI paging. Thus, if the UE wants to attach to the network and the network requests its real identity, a privacy-configured 5G UE configured with this privacy indicator would not answer.

Given the above-described privacy indicators, a wide variety of network configurations can be employed to implement the privacy indicators. FIGS. 1-7 depict some of these network configurations. However, it is to be appreciated that embodiments are not limited to the network configurations illustrated herein or otherwise described below. FIG. 1 shows a communication system 100 within which illustrative embodiments are implemented. It is to be understood that the elements shown in communication system 100 are intended to represent main functions provided within the system, e.g., UE access functions, mobility management functions, serving gateway functions, etc. As such, the blocks shown in FIG. 1 reference specific elements in LTE and 5G networks that provide the main functions. However, other network elements may be used to implement some or all of the main functions represented. Also, it is to be understood that not all functions of an LTE or 5G network are depicted in FIG. 1. Rather, functions that facilitate an explanation of illustrative embodiments are represented.

Accordingly, as shown, communication system 100 comprises user equipment (UE) 102 that communicates via an air interface 103 with an access point (eNB/gNB) 104. The UE 102 may be a mobile station, and such a mobile station may comprise, by way of example, a mobile telephone, a computer, or any other type of communication device. In an LTE-V2X implementation, one or more UEs may be deployed in a given vehicle. The term "user equipment" as used herein is therefore intended to be construed broadly, so as to encompass a variety of different types of mobile stations, subscriber stations or, more generally, communication devices, including examples such as a combination of a data card inserted in a laptop or other equipment (e.g., a vehicle). Such communication devices are also intended to encompass devices commonly referred to as access terminals.

In one embodiment, UE 102 is comprised of a Universal Integrated Circuit Card (UICC) and Mobile Equipment (ME). The UICC is the user-dependent part of the UE and contains at least one Universal Subscriber Identity Module (USIM) and appropriate application software. The USIM securely stores the International Mobile Subscriber Identity (IMSI) number and its related key, which are used to identify and authenticate subscribers to access networks. The ME is the user-independent part of the UE and contains terminal equipment (TE) functions and various mobile termination (MT) functions.

The access point 104 is illustratively part of an access network of the communication system 100. Such an access network may comprise, for example, an E-UTRAN or 5G System (or mixed) having a plurality of base stations and one or more associated radio network control functions. The base stations and radio network control functions may be logically separate entities, but in a given embodiment may be implemented in the same physical network element, such as, for example, a base station router or femto cellular access point.

The access point 104 in this illustrative embodiment is operatively coupled to a mobility management function 106. In an LTE network, the function is typically implemented by a Mobility Management Element (MME), while in a 5G network, the function is implemented by an Access and Mobility Management Function (AMF). Although not expressly shown, SEAF can be implemented with the AMF connecting a UE with the mobility management A mobility management function, as used herein, is the element or function in the CN part of the communication system that manages, among other network operations, access and authentication operations with the UE (through the access point 104).

The MME/AMF 106 in this illustrative embodiment is operatively coupled to an SLF 107. In illustrative embodiments, SLF 107 is configured as described above to respond to one or more privacy indicators that are set in messages it receives. As described above, SLF 107 may decrypt a subscriber identity or simply forward the encrypted information to the appropriate home network of UE 102, depending on the one or more privacy indicators. Thus, as shown, SLF 107 is operatively coupled to a plurality of HSSs/UDMs 108-1, 108-2, . . . , 108-N These HSSs/UDMs represent the home networks of UEs that may attach to the communication system 100. SLF 107 is configured to provide the UE information to the appropriate HSS/UDM 108.

The access point 104 is also operatively coupled to a serving gateway function 110 (e.g., Serving Gateway (SGW) in an LTE network, and Session Management Function (SMF) in a 5G network), which is operatively coupled to a Packet Data Network (PDN) Gateway (PGW) 112 PGW 112 is operatively coupled to a Packet Data Network, e.g., Internet 114. MME/AMF 106 and SLF 107 may be considered part of a CN. MME/AMF 106 and SLF 107 can also be part of a serving network. Further typical operations and functions of such network elements are not described here since they are not the focus of the illustrative embodiments and may be found in appropriate 3GPP LTE or 5G documentation.

It is to be appreciated that this particular arrangement of system elements is an example only, and other types and arrangements of additional or alternative elements can be used to implement a communication system in other embodiments. For example, in other embodiments, the system 100 may comprise authentication elements, as well as other elements not expressly shown herein.

Accordingly, the FIG. 1 arrangement is just one example configuration of a wireless cellular system, and numerous alternative configurations of system elements may be used. For example, although only single UE, eNB/gNB, MME/AMF, SLF, SGW/SMF and PGW elements are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices Network slices (network partitions) comprise a series of function sets (i.e., function chains) for each corresponding service type using network function virtualization (NFV) on a common physical infrastructure.

The network slices are instantiated as needed for a given service, e.g., eMBB service, massive IoT service (e.g., V2X service), and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via eNB/gNB 104.

Figure 2:
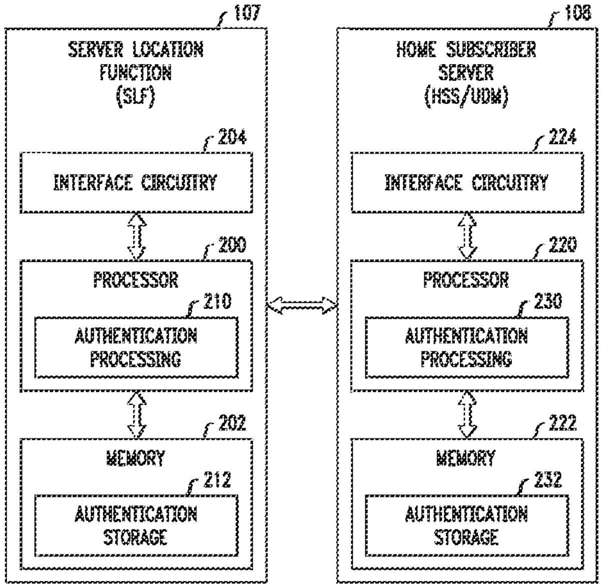
FIG. 2 shows a more detailed view of a server location function and a home subscriber server in an illustrative embodiment.

FIG. 2 shows a more detailed view of SLF 107 and one HSS/UDM 108 in an illustrative embodiment. Each HSS/UDM 108 (108-1, 108-2, . . . , 108-N) in FIG. 1 can be configured as shown in FIG. 2. The SLF 107 comprises a processor 200 coupled to a memory 202 and interface circuitry 204. The processor 200 of the SLF 107 includes an authentication processing module 210 that may be implemented at least in part in the form of software executed by the processor 200. The authentication processing module 210 performs authentication operations of the processes described in conjunction with subsequent figures and otherwise herein. The memory 202 of the SLF 107 includes an authentication storage module 212 that stores authentication and related data generated or otherwise used during authentication operations.

The HSS/UDM 108 comprises a processor 220 coupled to a memory 222 and interface circuitry 224. The processor 220 of the HSS/UDM 108 includes an authentication processing module 230 that may be implemented at least in part in the form of software executed by the processor 220. The authentication processing module 230 performs the authentication operations of the processes described in conjunction with subsequent figures and otherwise herein. The memory 222 of the HSS/UDM 108 includes an authentication storage module 232 that stores authentication and related data generated or otherwise used during authentication operations.

The processors 200 and 220 of the respective SLF 107 and HSS/UDM 108 may comprise, for example, microprocessors, application-specific integrated circuits (ASICs), digital signal processors (DSPs) or other types of processing devices, as well as portions or combinations of such elements.

The memories 202 and 222 of the respective SLF 107 and HSS/UDM 108 may be used to store one or more software programs that are executed by the respective processors 200 and 220 to implement at least a portion of the functionality described herein. For example, authentication operations and other functionality as described in conjunction with subsequent figures and otherwise herein may be implemented in a straightforward manner using software code executed by processors 200 and 220.

A given one of the memories 202 or 222 may therefore be viewed as an example of what is more generally referred to herein as a computer program product or still more generally as a processor-readable storage medium that has executable program code embodied therein Other examples of processor-readable storage media may include disks or other types of magnetic or optical media, in any combination Illustrative embodiments can include articles of manufacture comprising such computer program products or other processor-readable storage media.

The memory 202 or 222 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 204 and 224 of the respective SLF 107 and HSS/UDM 108 illustratively comprise transceivers or other communication hardware or firmware that allows the associated system elements to communicate with one another in the manner described herein.

It is apparent from FIG. 2 that SLF 107 is configured for communication with HSS/UDM 108 and vice-versa via their respective interface circuitries 204 and 224. This communication involves SLF 107 sending data to the HSS/UDM 108, and the HSS/UDM 108 sending data to the SLF 107. However, in alternative embodiments, other network elements may be operatively coupled between the SLF and the HSS/UDM The term "data" as used herein is intended to be construed broadly, so as to encompass any type of information that may be sent between user equipment and a core network via a base station element including, but not limited to, identity data, authentication data, control data, audio, video, multimedia, etc.

It is to be appreciated that the particular arrangement of components shown in FIG. 2 is an example only, and numerous alternative configurations may be used in other embodiments. For example, the user equipment and mobility management function can be configured to incorporate additional or alternative components and to support other communication protocols.

Other system elements, such as UE 102, eNB/gNB 104, MME/AMF 106, SGW/SMF 110, and PGW 112, may each also be configured to include components such as a processor, memory and network interface. These elements need not be implemented on separate stand-alone processing platforms, but could instead, for example, represent different functional portions of a single common processing platform. Such a processing platform may additionally comprise at least portions of an eNB/gNB and an associated radio network control function.

FIGS. 3-7 illustrate message flows and network configurations within which one or more of the above-described privacy indicators can be implemented. These message flows and network configurations are understood to be illustrative embodiments.

Figure 3:
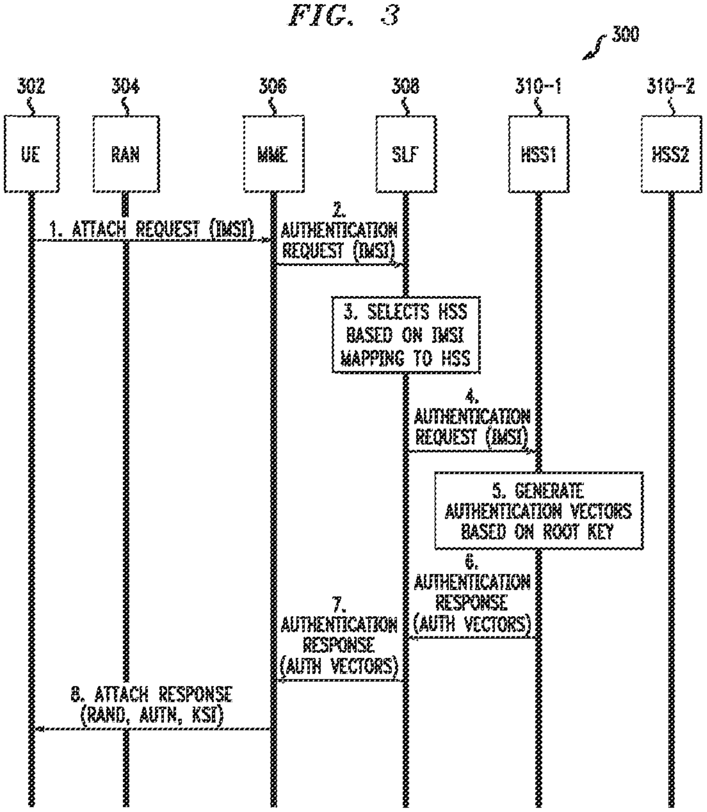
FIG. 3 shows a message flow for a user equipment authentication procedure for an LTE network in an illustrative embodiment.

FIG. 3 illustrates a high-level UE authentication procedure 300 in LTE using unencrypted IMSI, SLF and multiple HSS, in accordance with one illustrative embodiment.

More particularly, FIG. 3 shows a UE 302, a RAN 304, an MME 306, a SLF 308, an HSS1 310-1 and an HSS2 310-2. Although only two HSSs are depicted, any number of HSS may be implemented in accordance with the embodiments described herein. In step 1 of the UE authentication procedure flow of FIG. 3, the UE 302 sends an attach request (IMSI) through the RAN 304 to the MME 306. In step 2, the MME 306 then sends an authentication request (IMSI) to the SLF 308. In step 3, the SLF 308 selects an HSS based on IMSI mapping to the HSS. In step 4, the SLF 308 sends the authentication request (IMSI) to the selected HSS, which as indicated in FIG. 3, is HSS1 310-1. In step 5, the HSS1 310-1 generates authentication vectors (AVs) based on a root key. In step 6, the HSS1 310-1 sends an authentication response (AVs) to the SLF 308, and in step 7, the SLF 308 sends the authentication response (AVs) to the MME 306. The authentication response may comprise a random challenge (RAND), an authentication token (AUTN) and a key set identifier (KSI). In step 9, the MIME 306 sends an attach response to the UE 302 through the RAN 304.

Figure 4:
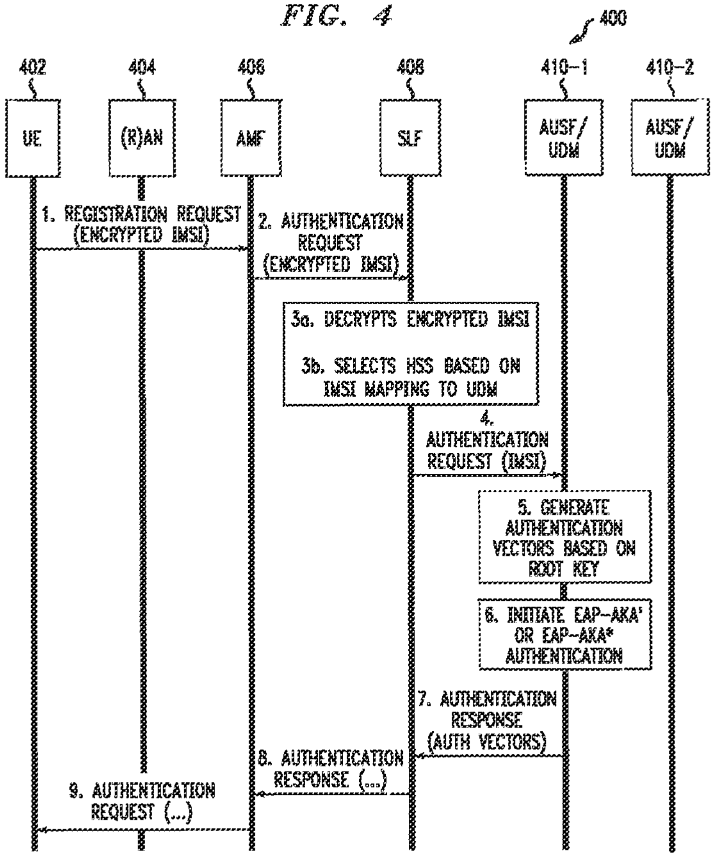
FIG. 4 shows a message flow for a user equipment authentication procedure for a 5G network in an illustrative embodiment.

FIG. 4 illustrates a high-level UE authentication procedure 400 in 5G using encrypted IMSI, a SLF and multiple UDM. Performing the IMSI decryption at the SLF instead of the UDM helps to maintain the core authentication functions unchanged, in accordance with one illustrative embodiment. As used herein, the acronym EAP refers to Extensible Authentication Protocol, and the acronym AKA refers to Authentication and Key Agreement.

More particularly, FIG. 4 shows a UE 402, a (R)AN 404, an AMF 406, an SLF 408, an AUSF/UDM 410-1 and an AUSF/UDM 410-2. Although only two AUSF/UDMs are depicted, any number of AUSF/UDMs may be implemented in accordance with the embodiments described herein. In step 1 of the UE authentication procedure flow of FIG. 4, the UE 402 sends a registration request (encrypted IMSI) through the (R)AN 404 to the AMF 406. Note that by referring to encrypted IMSI, this can refer to the portion of the IMSI that is typically encrypted, e.g., MSIN, or all or other parts of IMSI. In step 2, the AMF 406 sends an authentication request (encrypted IMSI) to the SLF 408. Step 3 includes sub-steps 3*a* and 3*h*. In step 3*a*, the SLF 408 decrypts the encrypted IMSI. In one embodiment, the SLF 408 decrypts the encrypted IMSI using a provisioned certificate. In step 3*h*, the SLF 408 selects an HSS based on IMSI mapping to the UDM. In step 4, the SLF 408 sends the authentication request (IMSI) to the selected UDM, which as indicated in FIG. 4, is AUSF/UDM 410-1. In step 5, the AUSF/UDM 410-1 generates authentication vectors (AVs) based on a root key. In step 6, the AUSF/UDM 410-1 initiates EAP AKA' authentication or EAP AKA* authentication (AKA* refers to AKA with increased home control). In step 7, the AUSF/UDM 410-1 sends an authentication response (AVs) to the SLF 408, and in step 8, the SLF 408 sends the authentication response (AVs) to the AMF 406. In step 9, the AMF 406 sends an authentication request to the UE 402 through the (R)AN 404.

Figure 5:
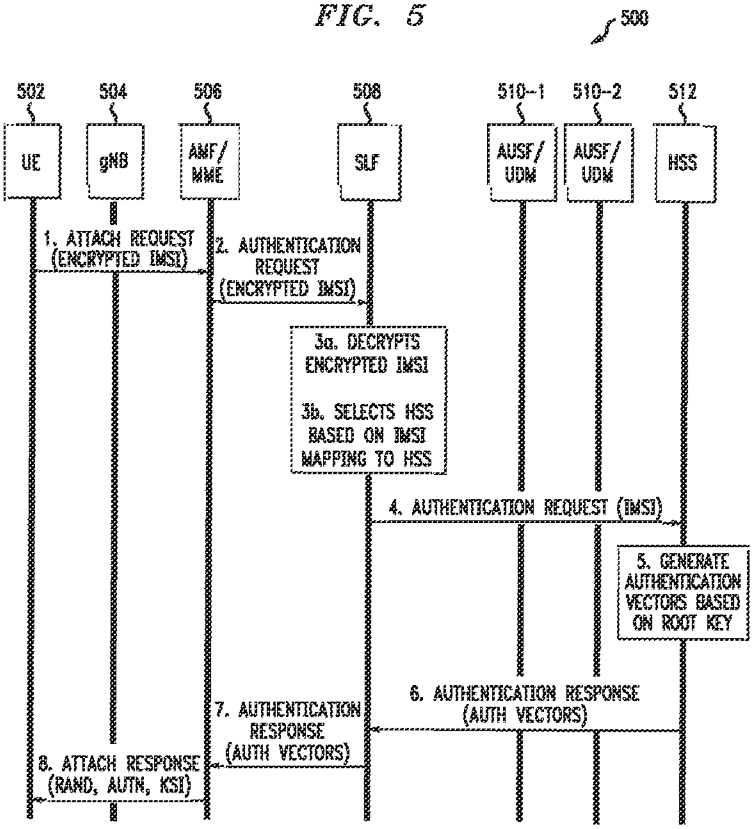
FIG. 5 shows a message flow for a user equipment authentication procedure for a mixed LTE/5G network in an illustrative embodiment.

FIG. 5 illustrates a procedure 500 for a mixed core architecture of UDM and HSS to support 4G LTE and 5G networks, in accordance with one illustrative embodiment. IMSI decryption at SLF helps to manage both cores.

More particularly, FIG. 5 shows a UE 502, a gNB 504, an AMF/MME 506, an SLF 508, an AUSF/UDM 510-1, an AUSF/UDM 510-2, and an HSS 512. Although only two AUSF/IDMs are depicted, any number of AUSF/IDMs may be implemented in accordance with the embodiments described herein.

In step 1 of the procedure of FIG. 5, the UE 502 sends an attach request (encrypted IMSI) through the gNB 504 to the AMF/MME 506. Note that by referring to encrypted IMSI, this can refer to the portion of the IMSI that is typically encrypted, e.g., MSIN, or all or other parts of IMSI In step 2, the AMF/MME 506 then sends an authentication request (encrypted IMSI) to the SLF 508. Step 3 includes sub-steps 3*a* and 3*h*. In step 3*a*, the SLF 508 decrypts the encrypted IMSI. In one embodiment, the SLF 508 decrypts the encrypted IMSI using a provisioned certificate. In step 3*b*, the SLF 508 selects an HSS based on IMSI mapping to the HSS. In step 4, the SLF 508 sends the authentication request (IMSI) to the selected HSS, HSS 512, through the AUSF/UDMs 510-1 and 510-2. In step 5, the HSS 512 generates authentication vectors (AVs) based on a root key. In step 6, the HSS 512 sends an authentication response (AVs) to the SLF 508 through the AUSF/UDMs 510-1 and 510-2, and in step 7, the SLF 508 sends the authentication response (AVs) to the AMF/MME 506. In step 8, the AMF/MME 506 sends an attach response to the UE 502 through the gNB 504.

Figure 6:
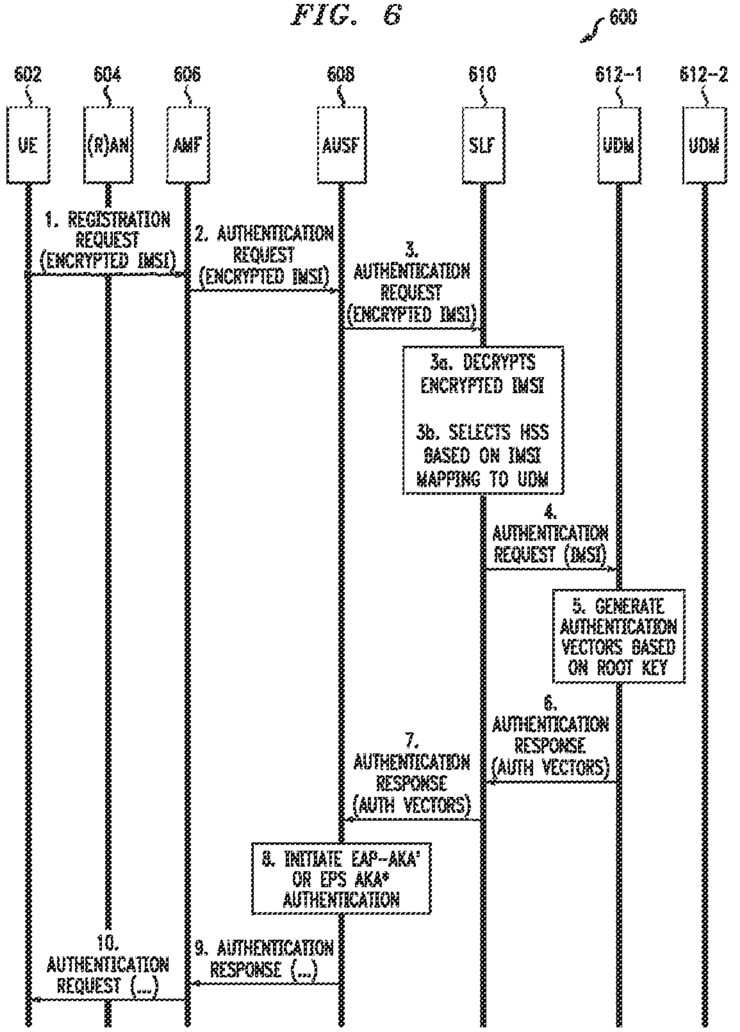
FIG. 6 shows a message flow for a user equipment authentication procedure for a 5G network in another illustrative embodiment.

FIG. 6 illustrates a high-level UE authentication procedure 600 in 5G using encrypted IMSI, an SLF, and multiple UDM, in accordance with an illustrative embodiment. Performing the IMSI decryption at the SLF instead of the UDM helps to maintain the core authentication functions unchanged.

More particularly, FIG. 6 shows a UE 602, a (R)AN 604, an AMF 606, an AUSF 608, an SLF 610, a UDM 612-1, and a UDM 612-2. Although only two UDMs are depicted, any number of UDMs may be implemented in accordance with the embodiments described herein. In step 1 of the high-level UE authentication procedure flow of FIG. 6, the UE 602 sends a registration request (encrypted IMSI) through the (R)AN 604 to the AMF 606. Note that by referring to encrypted IMSI, this can refer to the portion of the IMSI that is typically encrypted, e.g., MSIN, or all or other parts of IMSI. In step 2, the AMF 606 then sends an authentication request (encrypted IMSI) to the AUSF 608. In step 3, the AUSF 608 sends the authentication request (encrypted IMSI) to the SLF 610. In step 3*a*, the SLF 610 decrypts the encrypted IMSI. In one embodiment, the SLF 610 decrypts the encrypted IMSI using a provisioned certificate. In step 3*b*, the SLF 610 selects an HSS based on IMSI mapping to the UDM. In step 4, the SLF 610 sends the authentication request (IMSI) to the selected UDM, which is indicated in FIG. 6 as UDM 612-1. In step 5, the UDM 612-1 generates authentication vectors (AVs) based on a root key. In step 6, the UDM 612-1 sends an authentication response (AVs) to the SLF 610, and in step 7, the SLF 610 sends the authentication response (AVs) to the AUSF 608. In step 8, the AUSF 608 initiates EAP AKA' authentication or EAP AKA* authentication. In step 9, the AUSF 608 sends the authentication response to the AMF 606. In step 10, the AMF 606 sends an authentication request to the UE 602 through the (R)AN 604.

Figure 7:
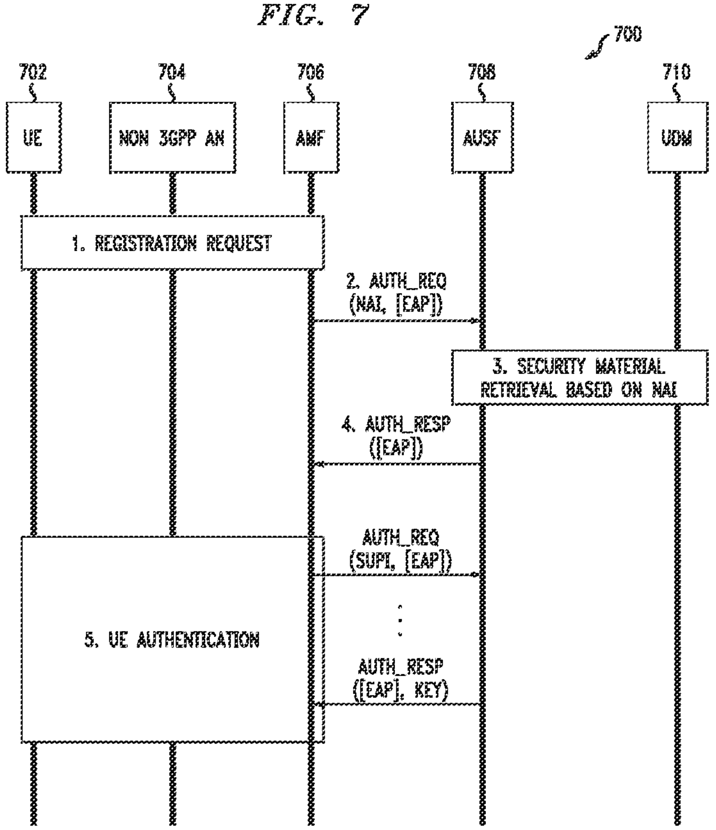
FIG. 7 shows a message flow for a user equipment accessing a 5G network via non-3GPP access and authentication in an illustrative embodiment.

FIG. 7 illustrates a procedure 700 for a UE accessing the 5G network via non-3GPP access (WLAN) and authentication, in accordance with an illustrative embodiment. As used herein, the acronym AN refers access network, the acronym NAI refers to Network Access Identifier and the acronym SUPI refers to the Serialized Unique Product Identifier of the UE.

More particularly, FIG. 7 shows a UE 702, a Non-3GPP AN 704, an AMF 706, an AUSF 708, and a UDM 710. In step 1 of the procedure of FIG. 7, the UE 702 sends a registration request through the Non-3GPP AN 704 to the AMF 706. In step 2, the AMF 706 sends an authentication request (NAI, [EAP]) to the AUSF 708. The AUSF 708 can decide an authentication type (e.g., EAP AKA' authentication or EAP AKA* authentication), and acts as an EAP server and performs EAP AKA' authentication or EAP AKA* authentication. In step 3, security material is retrieved from the UDM 710 based on the NAI. In step 4, the AUSF 708 sends an authentication response ([EAP]) to the AMF 706, which initiates UE Authentication at step 5. As shown, during UE Authentication, the AMF 706 sends an authentication request (SUPI, [EAP]) to the AUSF 708. Several authentication request messages may be required between the UE 702 and the AUSF 708 (e.g., via the AMF 706) depending on the chosen EAP authentication method. Upon successful UE authentication, the AUSF 708 sends the AMF 706 an authentication response ([EAP], Key). The Key is a security key that may be used by the AMF 706 to generate Non-Access Stratum (NAS), Control Plane (CP) and User Plane (UP) specific security keys.

Techniques discussed herein provide one or more privacy indicators for authentication requests in communication systems. For example, such privacy indicators can be controlled (e.g., set) by using one or more bits in an information element or flag that is transmitted to elements of a communication system. Furthermore, methods and mechanisms are provided that address how the home network of user equipment and other elements/functions in the core network (e.g., a server location function) can efficiently process the one or more privacy indicators. Advantageously, the one or more privacy indicators save wasted computing resources in the one or more network configurations in which they are implemented.

It is to be appreciated that the naming of identifiers mentioned herein, e.g., IMSI, etc., are for illustrative purposes only. That is, an identifier for a UE may have different names or acronyms in different protocols and standards for different communication network technologies. As such, none of the specific names or acronyms given to these identifiers herein are intended to limit embodiments in any manner.

As indicated previously, the embodiments are not limited to the LTE or 5G context and the disclosed techniques can be adapted in a straightforward manner to a wide variety of other communication system contexts including, but not limited to, other 3GPP systems and non-3GPP systems which employ identity (e.g., IMSI or equivalent) in the identity request process.

The processor, memory, controller and other components of a user equipment or base station element of a communication system as disclosed herein may include well-known circuitry suitably modified to implement at least a portion of the identity request functionality described above.

As mentioned above, embodiments may be implemented in the form of articles of manufacture each comprising one or more software programs that are executed by processing circuitry of user equipment, base stations or other elements of a communication system Conventional aspects of such circuitry are well known to those skilled in the art and therefore will not be described in detail herein. Also, embodiments may be implemented in one or more ASICS, FPGAs or other types of integrated circuit devices, in any combination. Such integrated circuit devices, as well as portions or combinations thereof, are examples of "circuitry" as that term is used herein. A wide variety of other arrangements of hardware and associated software or firmware may be used in implementing the illustrative embodiments.

It should therefore again be emphasized that the various embodiments described herein are presented by way of illustrative example only, and should not be construed as limiting the scope of the claims. For example, alternative embodiments can utilize different communication system configurations, user equipment configurations, base station configurations, identity request processes, messaging protocols and message formats than those described above in the context of the illustrative embodiments. These and numerous other alternative embodiments within the scope of the appended claims will be readily apparent to those skilled in the art.

The invention claimed is:

1. A user equipment (UE) comprising:

at least one processor; and at least one memory storing instructions therein that, when executed by the at least one processor, cause the UE to perform at least:

receiving, from a first element or function in a wireless communication network, a broadcast message comprising a System Information Block (SIB) or a Master Information Block (MIB), the SIB or the MIB indicating to the UE whether the wireless communication network is configured to handle privacy-protected subscription identifiers;

determining, based at least on the SIB or the MIB, that the wireless communication network is configured to handle privacy-protected subscription identifiers;

adding, to a registration request, a subscription identifier for a subscriber of the wireless communication network, the subscription identifier being a privacy-protected subscription identifier, the subscriber being associated with the UE;

adding the registration request comprising the privacy-protected subscription identifier to a message;

adding, to the message, one or more privacy indicators comprising a field that indicate that the subscription identifier in the registration request is privacy protected; and sending the message to a second element or function in the wireless communication network.

2. The UE of claim 1, wherein the wireless communication network comprises a fifth-generation (5G) network.

3. The UE of claim 1, wherein the one or more privacy indicators in the message are one or more second privacy indicators, and wherein the broadcast message further comprises a first privacy indicator indicating whether the wireless communication network is configured to handle privacy-protected subscription identifiers.

4. The UE of claim 3, wherein the field in the message is a second field, and wherein the one or more first privacy indicators comprise a first field indicating whether the wireless communication network is configured to handle privacy-protected subscription identifiers.

5. A method of communication, the method comprising:

receiving, at a user equipment (UE) associated with a subscriber of a communication network, from a first element or function in the communication network, a broadcast message comprising a System Information Block (SIB) or a Master Information Block (MIB), the SIB or the MIB indicating whether the communication network is configured to handle privacy-protected subscription identifiers;

determining, at the UE, based on the SIB or the MIB, that the communication network is configured to handle privacy-protected subscription identifiers;

adding, by the UE, to a registration request, a subscription identifier for the subscriber of the communication network, the subscription identifier being a privacy-protected subscription identifier;

adding, by the UE, the registration request to a message;

adding, by the UE, one or more privacy indicators to the message, the one or more privacy indicators comprising a field that indicates that the subscription identifier in the registration request is privacy protected; and sending the message from the UE to a second element or function in the communication network.

6. The method of claim 5, wherein the one or more privacy indicators in the message are one or more second privacy indicators, and wherein the broadcast message further comprises a first privacy indicator indicating whether the communication network is configured to handle privacy-protected subscription identifiers.

7. The method of claim 6, wherein the field in the message is a second field, and wherein the one or more first privacy indicators comprise a first field indicating whether the communication network is configured to handle privacy-protected subscription identifiers.

8. The method of claim 5, wherein the privacy-protected subscription identifier comprises at least a portion of a permanent subscription identifier of the subscriber.

9. The method of claim 5, wherein the privacy-protected subscription identifier is privacy-protected utilizing a public key of a home network operator of the subscriber.

10. The method of claim 5, wherein the second element or function in the communication network comprises a Server Location Function (SLF) that utilizes the subscription identifier to map the registration request to a Home Subscriber Server (HSS) or User Data Management (UDM) function.

11. The method of claim 5, wherein the communication network comprises a fifth-generation (5G) system.

12. A method of communication, the method comprising:

generating, at a first element or function in a communication network, a broadcast message comprising a System Information Block (SIB) or a Master Information Block (MIB), the SIB or the MIB indicating whether the communication network is configured to handle privacy-protected subscription identifiers;

transmitting, by the first element or function in the communication network, the broadcast message;

receiving, at a second element or function in the communication network, from a user equipment (UE), a message comprising a registration request and one or more privacy indicators, the registration request comprising a privacy-protected subscription identifier for a subscriber of the communication network, the subscriber being associated with the UE, the one or more privacy indicators indicating that the privacy-protected subscription identifier in the registration request is privacy protected; and based upon the one or more privacy indicators, processing the message to determine a subscription identifier for the UE from which the message is received, wherein the processing the message comprises removing privacy protection from the privacy-protected subscription identifier in the message to determine the subscription identifier for the subscriber associated with the UE, wherein the second element or function in the communication network comprises a Server Location Function (SLF) that utilizes the subscription identifier to map the registration request to a Home Subscriber Server (HSS) or a User Data Management (UDM) function.

* * * * *